Patented Feb. 21, 1933

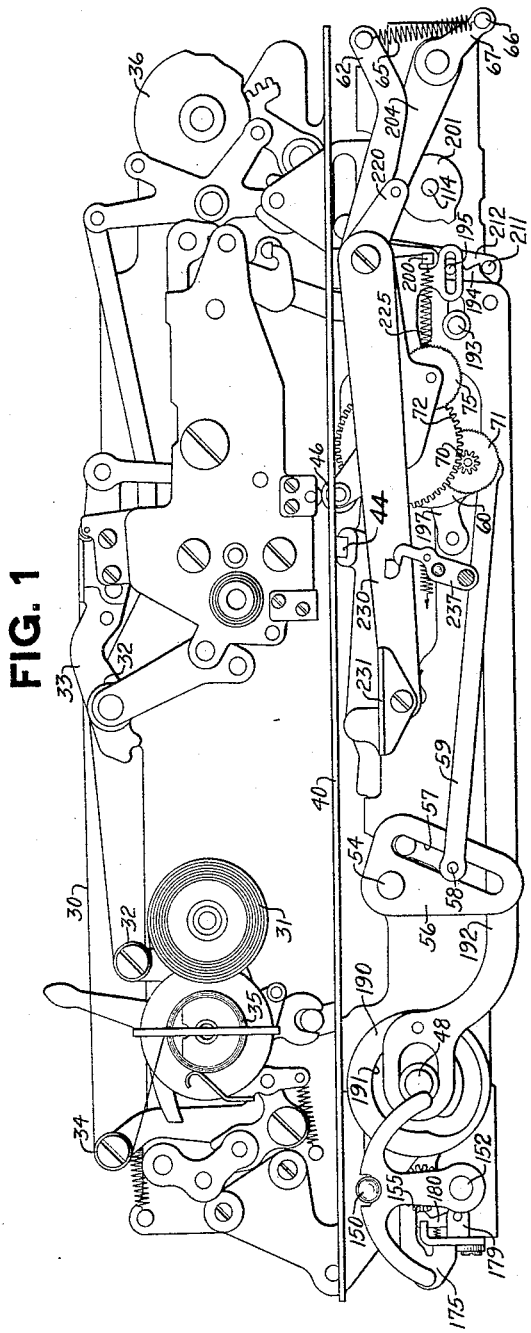

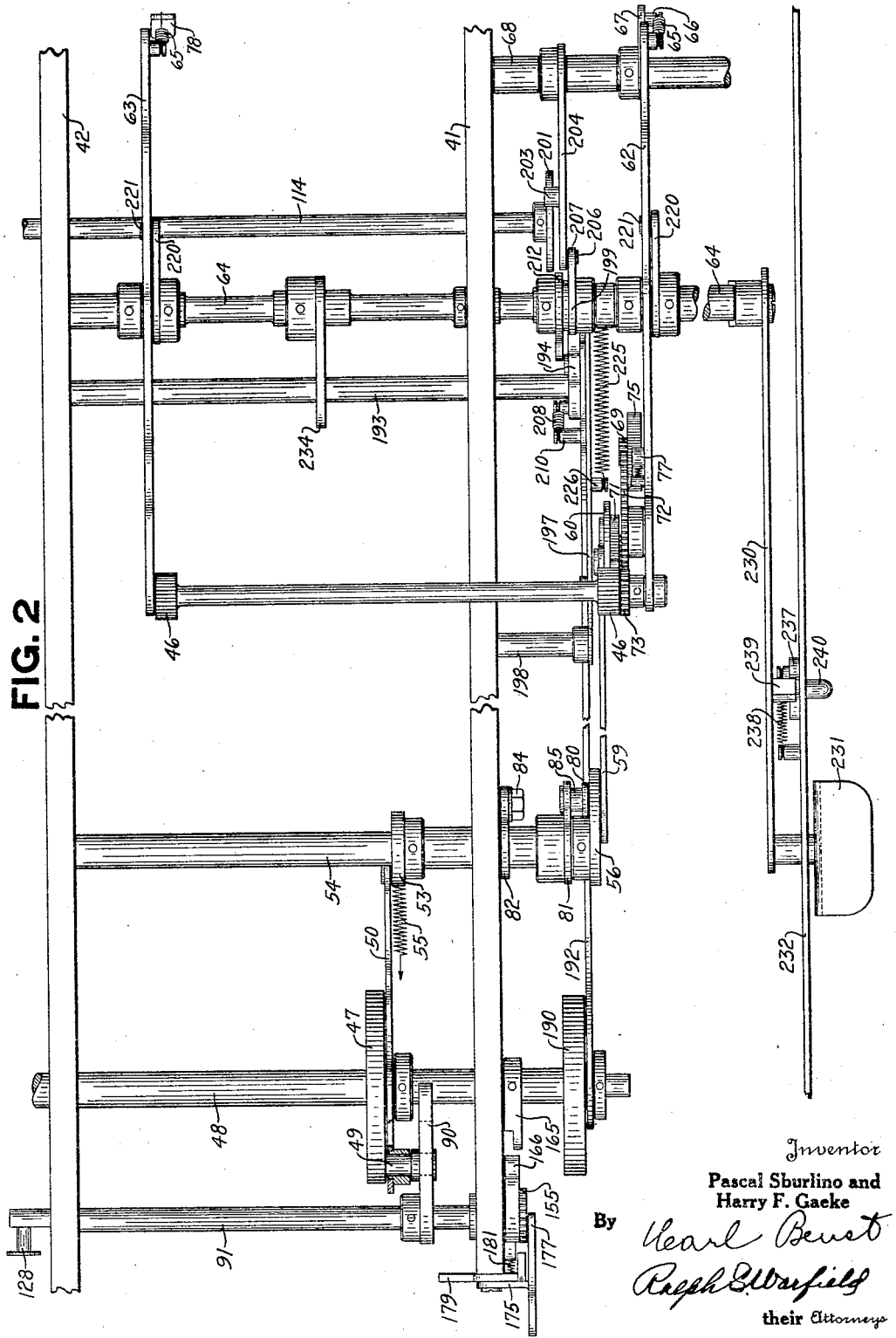

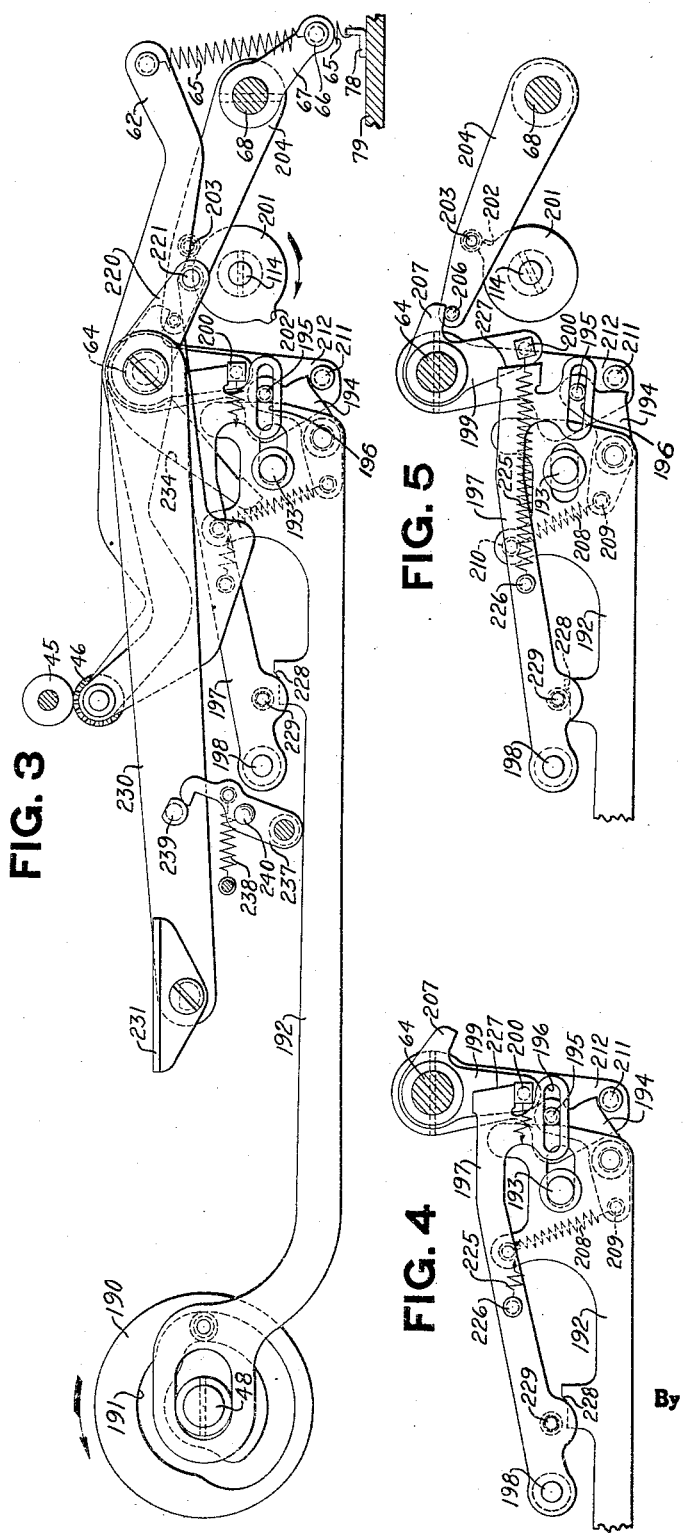

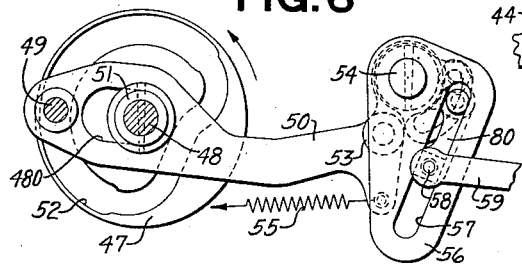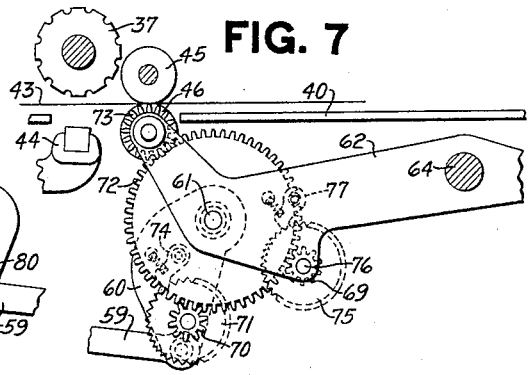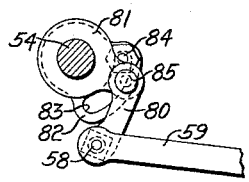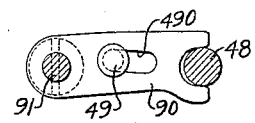
| | | DATE | CHECKS | CHECKS | DEPOSIT | TR. | DATE | BALANCE |
|---|---|---|---|---|---|---|---|---|
| 1 | 1 | JAN-10 | 10.00 | 2.50 | 50.00 | | | |
| 2 | 2 | JAN-15 | 5.50 | 3.00 | | | | |
| 3 | 3 | FEB-3 | 6.00 | 5.00 | | | | |
| 4 | 4 | | | | | | 2-6 | 18.00 |
| 5 | 5 | | | | | | | |
| 6 | 6 | | | | | | | |
| 7 | 7 | | | | | | | |
| 8 | 8 | | | | | | | |
| 9 | 9 | | | | | | | |
| 10 | 10 | | | | | | | |
| 11 | 11 | | | | | | | |
| 12 | 12 | | | | | | | |
| 13 | 13 | | | | | | | |
| 14 | 14 | | | | | | | |
| 15 | 15 | | | | | | | |
| 16 | 16 | | | | | | | |

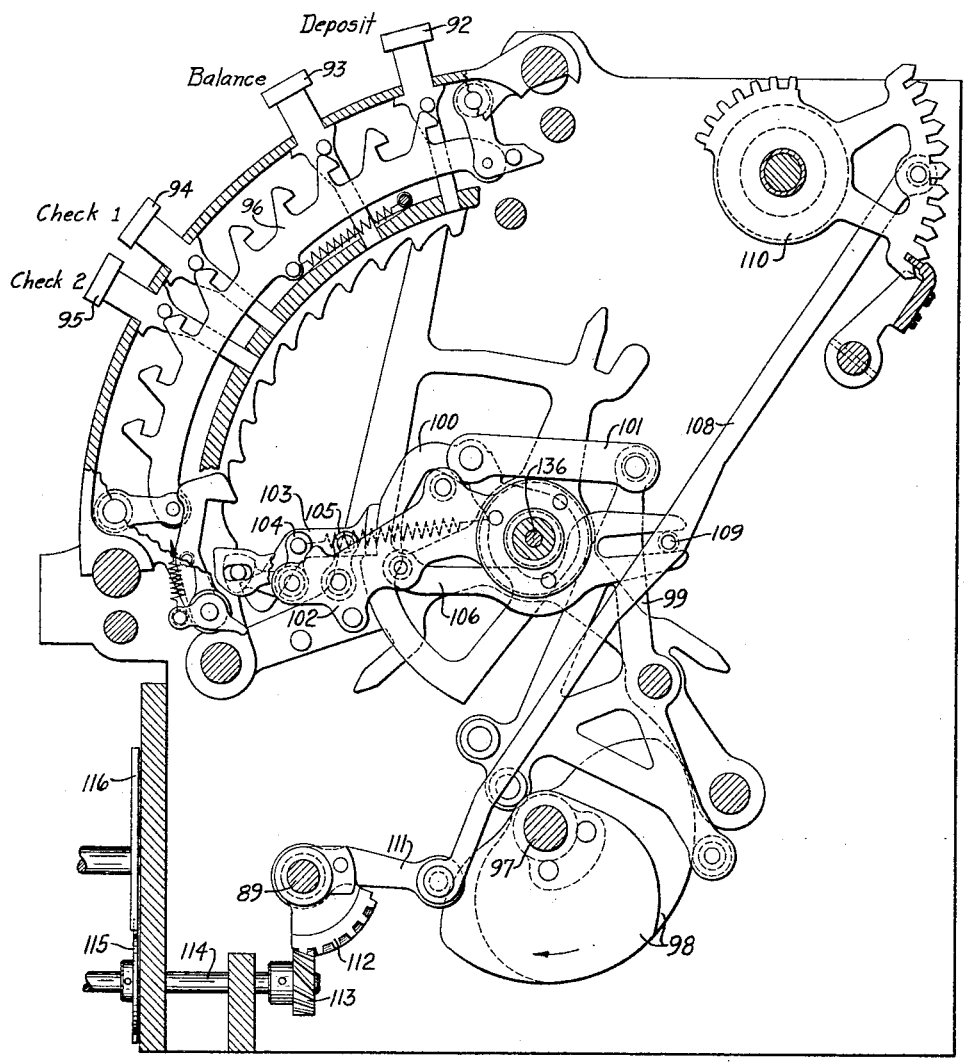

1,898,065

UNITED STATES PATENT OFFICE

PASCAL SBURLINO AND HARRY F. GAEKE, OF DAYTON, OHIO, ASSIGNORS TO THE NATIONAL CASH REGISTER COMPANY, OF DAYTON, OHIO, A CORPORATION OF MARYLAND

CASH REGISTER

Application filed October 12, 1927. Serial No. 225,726.

This invention relates to improvements in cash registers and like machines, and particularly to improvements in slip feeding mechanism, for machines of the type shown and described in Letters Patent of the United States, No. 1,619,796, issued to B. M. Shipley on March 1, 1927, Letters Patent of the United States, No. 1,504,226, issued to F. L. Fuller on August 12, 1924, and Letters Patent of the United States, No. 1,761,542, issued to B. M. Shipley on June 3, 1930.

One of the objects of this invention is to provide a machine for use in banks, and particularly in the commercial departments thereof, for printing statements of accounts, though its use is not confined to this function.

Another object of the invention is to provide a plurality of means for controlling the slip feeding mechanism, one being an automatic controlling means, effective at each operation of the machine, and another, a manually adjustable means whereby to render the line spacing mechanism effective for varying periods, irrespective of the automatic control. To accomplish the latter result said control manual means is adapted to be variously adjusted from its normal position, from one of which adjusted positions it is automatically returned to its normal position, it being adapted to remain in another of its adjusted positions indefinitely or until the operator manually returns it to its neutral position.

A further object of the invention is to provide a control for the tension or driving roller whereby the latter is withdrawn from contact with the idle roller at the end of a particular operation, namely during the operation in which a "balance" is printed.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a front elevation of the printer unit of a machine of the type shown and described in the above mentioned Shipley Patent No. 1,761,542, and shows the slip feed mechanism of the present invention applied to the machine disclosed in that application.

Fig. 2 is a plan view of the mechanism for controlling the feeding of slips or statement blanks.

Fig. 3 is a front elevation of the slip feed mechanism.

Fig. 4 is a detail view of a part of the mechanism shown in Fig. 3.

Fig. 5 is a detail view of the mechanism shown in Fig. 4, with the parts positioned so that the tension roller will be automatically withdrawn from contact with the idle roller upon the subsequent operation of the machine.

Fig. 6 is a detail view of the mechanism for operating the tension or driving roller.

Fig. 7 is a detail view of the tension roller and its driving mechanism.

Fig. 8 is a detail view of the means for adjusting the line spacing feed imparted by the feed mechanism to the slip or statement blank.

Fig. 9 is a detail view of a part of the mechanism for preventing operation of the line spacing mechanism.

Fig. 10 is a facsimile of a statement blank with the data as printed thereon by the machine.

Fig. 16 is a view in cross section through the first control bank of keys, showing the type of machine to which the invention is applied.

GENERAL DESCRIPTION

Figure 11:
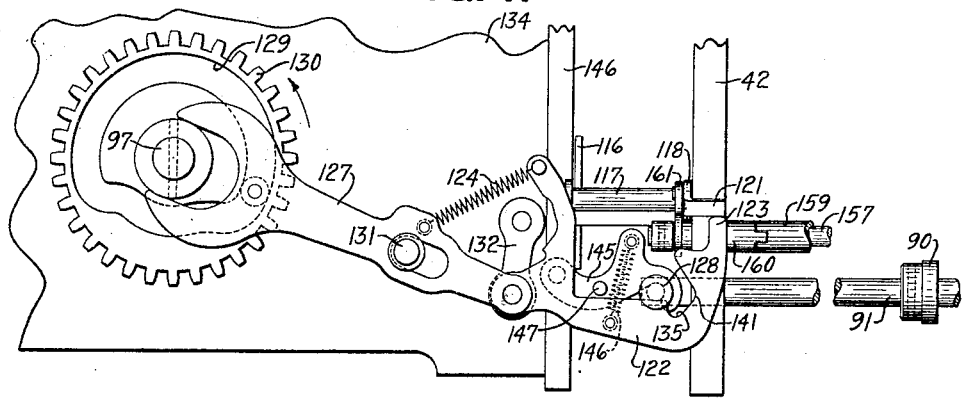
Fig. 11 is a side elevation of a part of the automatic control for the line spacing mechanism.

The invention disclosed herein is shown applied to a machine of the type illustrated in the above mentioned patents, and more particularly to a machine of the type shown in the above mentioned patent issued to B. M. Shipley, No. 1,761,542. The machine disclosed in Shipley's patent is intended for use in savings banks where the usual system is to print the amount of a deposit or withdrawal on a ledger card, which the bank retains for its record, and in a pass book, which the depositor retains as his record. The present invention renders a machine of this type particularly adaptable for use in handling commercial or checking accounts in banks, but the invention is not restricted in its use to this purpose as this is merely selected as one example of its many uses. Only so much of the machine is disclosed herein as is necessary to show the co-operation between the old mechanism and the new. For a detailed description of the prior mechanism reference may be had to the Shipley Patent No. 1,761,542 above mentioned.

The machine illustrated in the last-named Shipley patent has a shiftable carriage and a line finding device, (see Fig. 26 of the Shipley Patent No. 1,761,542), for selecting the proper line on which the data is to be entered in the pass book and on the ledger card. In handling commercial accounts, the bank sends out statements to each depositor at determined intervals, and the present invention is directed to mechanism for feeding, and controlling the feeding, of the slips or statement blanks, and is substituted for the carriage and line finding device above mentioned.

The invention includes a pair of slip or statement blank feeding rollers, one of which will be known herein as the driven roller and the other as the tension or driving roller. One of the rollers, as the driven roller, for instance, is on a fixed axis and is rotated only during certain operations of the machine, while the other roller, as the tension roller, for example, is carried on a pivoted frame, which is rocked to remove the tension roller from contact with the driven roller during certain operations of the machine. Rotation of the tension or driving roller, and the contact and interruption of contact of the tension or driving roller relatively to the driven roller is controlled automatically by keys on the keyboard, and conveniently, certain keys in what is known as the first control bank.

The full keyboard of the machine is not disclosed herein, as it forms no part of the present invention. Only the first bank of control keys (Fig. 16), is shown, which in the present instance, may include four keys designated herein as "deposit", "balance", "check 1" and "check 2". These keys control a mechanism to cause the impression to be made in any one of four columns. The column selecting mechanism is fully disclosed in the above mentioned Shipley Patent No. 1,761,542, to which reference is made for further description thereof.

When the "check 1" key is depressed, the amount set up on the keyboard is printed in the first "check" column from the left, (Fig. 10), and the slip or statement blank is not fed or advanced in line spacing direction. When the "check 2" key is depressed, the amount set up on the keyboard is printed in the second "check" column from the left, and the tension or drive roller is rotated to cause the slip or statement blank to be advanced to position the next line, opposite the printing line of the type wheels. The line space feed takes place after the impression is made. Thus it is apparent that the checks are listed in alternate columns. The system contemplates printing the first check listed in the first column, but should the operator by inadvertence depress the key for selecting the second column when entering the first check, the slip will be line spaced and the next check will be entered in the first column. On the other hand, should the operator depress the key for selecting the second column when only one check is to be entered, the slip will be line spaced, and then when a "deposit" or "balance" is printed it will be entered in the proper column, one line below the check entry. When the operator enters only one check and depresses the key for selecting the first column, the slip is not line spaced and the "deposit" or the "balance" is printed on the same line as the check. The latter condition always exists when the last check entered is printed in the first column. This has no particular significance, and is the result of the structural relation of the mechanism. The invention contemplates the printing of a minimum length of statement, and accomplishes this by listing the checks in alternate columns and by disregarding the line upon which the balance is printed. When the "deposit" key is depressed, the amount set up on the keyboard is printed in the third or "deposit" column, and the line space mechanism is not operated. During the operation, with any one of the three keys just above referred to depressed, the tension or driving roller remains in contact with the idle or driven roller. But, when the "balance" key is depressed, the amount which is taken from the totalizer is printed in the last column to the right, of the slip or statement blank, and the tension or driving roller is shifted out of contact with the idle roller. Printing of the balance is the last item to be printed on the statement blank, and for this reason the tension roller is shifted out of contact with the idle roller, to permit the statement blank to be more readily removed from the machine, and the new blank to be placed in position to be printed upon.

A manually set lever is also provided for the drive or tension roller, so that if desired, the tension roller may be withdrawn from contact with the feed roller by hand. A latch is provided for retaining the drive roller in its ineffective position for an indefinite period.

A manual control lever 150 is also provided for the tension or drive roller to regulate the line spacing of the statement blank at the will of the operator. This control lever, in the present instance, has three positions, a normal position, and two positions of adjustment. When the control lever is in its normal position, the operation of the line space mechanism is under control of the keys as above mentioned. When the control lever is shifted to the right, Fig. 1, the line space mechanism operates during the operation of the machine, but at the end of the machine operation, the control lever returns automatically to its normal position. When the control lever is shifted to the left, (Fig. 1), it remains in its adjusted position, so that the line space mechanism will operate during every operation of the machine until the operator manually returns the control lever to its normal position.

DETAILED DESCRIPTION

As above mentioned, the invention is shown applied to a machine of the type shown and described in the above mentioned Shipley Patent No. 1,761,542. Fig. 26 of Shipley's patent has been reproduced herein with the carriage and line finding device omitted, and with the improved mechanism substituted therefor, in Fig. 1 of this application. This printer unit carries a detail strip 30, Fig. 1, fed from a supply roll 31, over guide rolls 32 and under an upper printing hammer 33, and over a guide roll 34 to a receiving roll 35. This detail strip mechanism, together with the printer-operating mechanism, is fully shown and described in the above mentioned Shipley application.

By referring to the above mentioned Patent No. 1,761,542, a complete disclosure of the column printing mechanism will also be found. This mechanism includes cams 36 (Fig. 1) which are adjusted by the differential mechanism (Fig. 16) as determined by the selected control key. The amount type carriers 37 (Fig. 7), only one of which is shown, are adjusted under control of the amount keys (not shown) in a manner well known, and as shown and described in the above mentioned patents. The method of setting, and controlling the adjustments, of the various amount and control type carriers is well known in the art, and since it forms no part of the present invention, no further reference will be made herein. For a detailed description and disclosure of this mechanism, reference may be had to the above mentioned patents.

Slip table

A slip table 40 (Figs. 1 and 7) is mounted on and supported by the front and back frames 41 and 42 (Fig. 2), respectively, of the printer unit. A statement blank, such as is shown in Fig. 10, is placed on the slip table 40 in such position that the first impression is made on the line opposite the index numeral "1". The slip table 40 has an opening through which the tension or drive roller 46 and the impression hammer 44 pass, for contact with the statement blank, to effect line spacing and for making the type impression. The impression hammer 44 operates in the usual and well known manner, and reference may be had to the above mentioned Shipley Patent No. 1,761,542 for a detailed description thereof.

Slip feed mechanism

When placing the statement blank on the slip table, the blank is inserted between a pair of rollers, one of which is a driven roller 45 (Fig. 7), and the other the tension or drive roller 46.

The tension roller 46, as best shown in Fig. 2, is cut away or reduced in diameter intermediate its ends, the unmutilated ends of the roller being knurled to grip the paper. By reducing the diameter of the roller 46, great accuracy in manufacture is avoided, and a better gripping and more even feeding of the paper is effected.

The tension roller 46 may be rotated during each operation of the machine by a cam 47 (Fig. 6), secured to the printer drive shaft 48. The printer drive shaft 48 is rotated once in counter-clockwise direction (Fig. 6) during each operation of the machine, by mechanism well known in the art, and illustrated in the above mentioned patents.

A pitman 50 is provided, slotted near one end, as at 480, to embrace a hub 51 on the printer drive shaft 48, and carries a stud 49 adjacent such slotted end, entered in a cam race 52 in the cam 47. The hub 51 and shaft 48 support and guide the pitman 50, and the stud 49 (see also Fig. 2), is slidably mounted in the pitman for adjustment at right angles to the plane of travel of the pitman.

Normally, the inner end of the stud 49 projects into the cam race 52 and transmits motion from the cam 47 to the pitman 50 to actuate the tension roller 46 and line space the paper, but when it is desired to disable or "throw off" the line space feed mechanism, means is provided to automatically shift the stud 49 to withdraw its inner end from the cam race 52.

An arm 53, pinned to a rocking shaft 54, pivotally supports the right-hand end of the pitman 50 (Fig. 6). A spring 55 yieldingly retains the pitman 50 in its extreme lefthand position, with the right hand end of the slot 480 in contact with the hub 51 to limit the travel of the pitman in one direction. A slotted arm 56 is also secured to the rocking shaft 54, so that any movement of the pitman 50 is transmitted to the arm 56. The slot 57 in the arm 56 accommodates stud 58, upon which is pivotally supported the left-hand end of a link 59. The righthand end of the link 59 is pivotally connected to an arm 60 (Fig. 7), journaled on a stud 61, carried by one lever 62 which forms part of a frame 62, 63 supporting the tension roller 46. The opposite ends of the tension roller 46 are journaled in the levers 62, 63 of the supporting frame, such levers being pivotally mounted on a shaft 64. Springs 65 (Fig. 3) attached to the righthand ends of the respective levers 62, 63, rock the frame to press the tension roller 46 tightly against the driven roller 45. The lower end of the spring 65 for the lever 62 is attached to a stud 66 carried by an arm 67 secured to a stud 68 mounted in the frame 41. The spring 65 for the lever 63 is attached to an angle plate 78 (Figs. 2 and 3), secured to the base 79 of the machine.

A pinion 70, (Fig. 7), journaled on the arm 60, has secured thereto a ratchet disk 71. The pinion 70 meshes with an intermediate gear 72 mounted on the stud 61. The intermediate gear 72 meshes with a pinion 73, secured to the tension or driving roller 46. A spring-pressed retaining dog 74 co-operates with the ratchet disk 71 to permit the disk 71 and the pinion 70 to rotate in one direction only. Also meshing with the intermediate gear 72 is a pinion 69 having secured thereto a ratchet disk 75, both of which are mounted to rotate on a stud 76 on the lever 62. A spring-pressed dog 77 co-operates with the ratchet disk 75 to permit the pinion 69 to rotate only in counter clockwise direction (Fig. 7).

When the cam 47 rotates, at the beginning of the operation of the machine, it drives the pitman 50 to the right (Fig. 6), which, through arm 53, rockshaft 54 and arm 56 carrying stud 58, shifts the link 59 to the right (Fig. 7) to rock the arm 60 in counter clockwise direction. This retracting movement of the link 59 and arm 60 causes the pinion 70 to rotate and roll over the intermediate gear 72 in counter clockwise direction preparatory to imparting rotation to the tension roll 46. The intermediate gear 72 is locked against rotation at this time by the retaining dog 77 which co-operates with the ratchet disk 75, to prevent clockwise rotation of the ratchet and the pinion 69, which latter is in constant mesh with the intermediate gear 72. As the cam 47 in its rotation, operates on the stud 49 to draw the pitman 50 to its normal leftward position and with it the link 59 through the train of mechanism heretofore referred to, the tendency of the pinion 70 is to rotate clockwise and turn the ratchet 71 also, but such rotation of the pinion 70 is resisted by the dog 74 which locks the ratchet 71 and pinion 70 against rotation. Therefore, the pinion 70, by reason of its engagement with the intermediate gear 72, acts to turn the gear clockwise on its stud 61. The pinion 69 is, however, free to rotate. Thus, during the return movement toward the left (Fig. 7) of the link 59, the pinion 70 causes the intermediate gear 72 to rotate in clockwise direction. The gear 72 transmits counter-clockwise rotation to the pinion 73 and tension roller 46, to line space the slip or statement blank one step towards the left (Fig. 7), and in this manner the slip is advanced step by step to present a new surface to the printing wheels 37.

The amount of feed given the slip or statement blank can be varied by an adjustment provided at the left-hand end of the link 59 (Fig. 6). To this end, the left end of link 59 is pivoted on the stud 58 which projects into the guide slot 57 of the arm 56. Adjustment of the stud 58 either up or down in its slot 57 (Fig. 6), varies the amount of throw given the link 59. Thus it can be seen that the closer the stud 58 is shifted towards the center of the shaft 54, the amount of travel imparted to the link 59 will be shortened. However, if the stud 58 is moved towards the lower end of the slot 57, to position it farther from the center of the shaft 54, the amount of travel imparted to the link 59 will be increased and a longer step of feed given the paper.

Th stud 58 is carried by a link 80 (Figs. 6 and 8), the upper end of which is pivoted to an arm 81 loosely mounted on the shaft 54. A second arm 82 secured to the arm 81 by means of a hub has a curved slot 83 formed therein, through which passes a suitable fastening 84 screwed into the front printer frame 41 to hold the arm 82 in any of its adjusted positions.

By unscrewing this fastening, the arm 82 together with the arm 81 can be adjusted to any desired position, to lower or raise the stud 58 in the slot 57, as desired. After the stud is located in the proper position, the fastening 84 is tightened to hold the stud 58 in position. The link 59 is shiftable by the arm 56 due to the pivotal connection 85 between the link 80 and the arm 81.

As before mentioned, the slip or statement blank line spacing mechanism is automatically controlled to feed the paper, or not, as desired. In the form illustrated herein, only one of the control keys controls the line spacing mechanism to set it for operation, the remaining keys being arranged to disable or "throw off" the feed mechanism. To this end the arrangement is such that when an impression is made in the first column from the left marked "Checks", (Fig. 10), the slip or statement blank is not fed. However, after the printing has taken place in the second column from the left, marked "Checks", the slip or statement blank is advanced to present the next line on the paper to the types. After printing in the "deposit" or "balance" columns, the line space mechanism is not operated.

One convenient means to obtain these results is as follows: One end of a holder or plate 90, (Figs. 2 and 9), arranged substantially parallel with the pitman 50, is fastened to an axially shiftable shaft 91 (see also Fig. 11), the opposite end of the holder 90 is bifurcated to embrace the shaft 48 for guidance, and intermediate its ends, the holder is slotted, as at 490, to engage a peripheral reduced portion in the outer end of the stud 49, the inner end of which enters the cam race 52 in the disk 47 and normally forms the connection between such disk and the driving pitman 50.

The control keys determine whether or not the shaft 91 shall shift, during an operation of the machine, to withdraw the stud 49 from the cam race 52, or to permit its inner end to remain in such race. The cam race 52 is widened for a suitable distance on either side of the point normally occupied by the inner end of the stud 49 when the parts are in their home positions, to permit the stud 49 to easily reenter the cam race. Spring 55 operates to insure the return of the pitman 50 to its normal position at the leftward end of its travel when the machine is at rest, such leftward travel of the pitman being limited by contact of the righthand end of the slot 480 with the hub 51, at which time the connecting stud 49 is held intermediate the walls of the widened portion of the cam race 52. Slot 490 permits relative movement between the stud and the holder 90 both in this regard and during the reciprocation of the pitman 50 and stud 49 by the cam 47.

The upper key 92, (Fig. 16), of the bank of control keys is designated the "deposit" key. The next lower key 93, is designated the "balance" key. The third key 94, is designated "check 1" and the bottom key 95 is designated "check 2". The "check 1" and "check 2" keys control the printing of amounts in the first and second "check" columns on the statement blank or slip. The "check 2" key 95 controls mechanism so that at the beginning of an operation, the shaft 91 is shifted towards the rear of the machine (Fig. 11) or toward the left (if not already in such position) to enter the stud 49 in the cam race 52, whereas the keys 92, 93 and 94 control the last mentioned mechanism to cause the stud 49 to be withdrawn from the cam race 52. This control mechanism for the shiftable shaft 91 will now be described.

Assuming that the "check 1", or key 94, is depressed, a detent 96 maintains the key 94 in its depressed position in the usual and well known manner. Operation of the machine causes the usual cam shaft 97 to be rotated clockwise, thereby rotating the usual pair of cams 98 fixed on such cam shaft. The usual lever 99, co-operating with the cams 98, is connected by a link 101 with an actuator 100, a latch 103 connects the actuator 100 with a differentially movable arm 102. The latch 103 is pivotally connected to the differential arm 102 by a bell crank 104 and a link 105. Rotation of the cams 98 rocks the actuator 100 clockwise, which carries the differentially movable arm 102 along, until the outer end of the bell crank 104 engages the depressed key 94, whereupon continued movement of the driver disconnects the latch 103 from the actuator 100. The actuator 100 completes its clockwise movement, but the differentially movable arm 102 remains in the position at which it was disconnected from the actuator, by the depressed key. This movement of the differentially movable arm 102 correspondingly positions the forward end of a beam 106, pivoted to the arm 102, which beam in turn differentially positions a link 108, to which the beam is connected by means of a pin and slot connection 109. The upper end of the link 108 is pivoted to an arm 110, adapted to set indicators, not shown or described herein.

Figure 12:
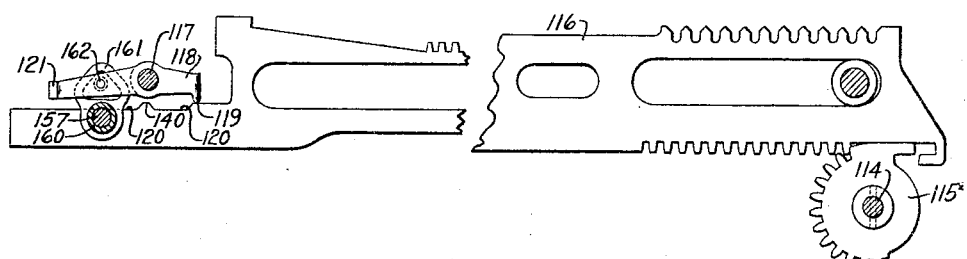
Fig. 12 is a detail view of the adjustable rack associated with the control bank of keys for determining the effectiveness or ineffectiveness of the automatic control of the slip or statement feed mechanism.

The lower end of the link 108 is pivoted to an arm 111 loosely mounted on a rod 89. Secured to the arm 111 is a spiral segment 112, meshing with a spiral pinion 113 secured to the shaft 114. The shaft 114 has secured thereto a segment 115 (see also Fig. 12), which meshes with a rack 116, which adjusts the type carrier 37 (Fig. 7) in the usual and well known manner. The rear end of the rack 116, in the present illustration, is formed with a node 140 and recesses 120, to control the position of a yoke 118 (Figs. 11 and 12). This yoke is pivoted on a stud 117, supported by the frame 42 and a frame 146. Of course, it is obvious that more nodes can be provided, or that recesses of varying extents may be substituted for the node and recesses shown, to obtain any desired control of the yoke 118. As shown in Fig. 12, the rack 116 is in that position which it assumes when the differential mechanism is in its lowermost position, as shown in Fig. 16. However, upon operation of the machine when the differential arm 102 is arrested by the inner end of the depressed key 94, as just described, the righthand end 119 (Fig. 12) of the yoke 118 drops into a recess 120, while the lefthand end (Fig. 12) of the yoke 118 swings upwardly. The upper end 123 of a driving pawl 122 contacts a flange 121 (Fig. 11) on the lefthand end of the yoke 118 (Fig. 12) under the influence of a spring 124, which spring rocks the yoke when permitted. The driving pawl 122 is pivotally mounted on the end of a pitman 127. The pitman 127 is slidably supported on a stud 131 and is pivoted to a link 132 carried by a stud on the side frame 134. A stud 128 on the shiftable shaft 91, prevents upward movement of the driving pawl 122 under influence of the spring 124, when the shaft 91 is in the position shown in Fig. 11. However, when the machine is operated and the cam shaft 97 (Fig. 11) is rotated counter clockwise, a cam race 129 cut in the side of a gear 130, shifts the pitman 127 leftwardly until a notch 135 in the pawl 122 lies opposite the stud 128. Thereupon, the spring 124 rocks the driving pawl 122 upwardly to fit the notch 135 around the stud 128, so that the pitman on its return movement, shifts the shaft 91 towards the right (Fig. 11) or front (Fig. 2) to withdraw the stud 49 from the cam race 52, and thus prevent line spacing by disabling the line space feed mechanism.

If the "check 2" key 95 is depressed, the differential arm 102 is controlled so that the node 140 (Fig. 12) on the rack 116 is brought beneath the end 119 of the yoke 118, thereby maintaining the end 119 in its raised position. With the end 119 in the raised position the flange 121 of the yoke 118 lies in the path of and prevents the drive pawl 122 from being raised under influence of the spring 124 when the pitman 127 is moved to the left (Fig. 11). Therefore, when the pitman 127 returns to its normal position at the right the shaft 91 is not shifted to the "off" position, and the stud 49 remains in the cam race 52. Hence the line space mechanism remains effective.

If, however, with the end 119 of the yoke 118 in contact with the node 140, and the shiftable shaft 91 is in the "off" position or at its righthand limit of travel, before the operation of the machine with the "check 2" key 95 depressed, then during the movement of the pitman 127 towards the left, a notch 141 formed in the drive pawl 122 engages the stud 128, to return the shaft 91 to its "on" position at the left, and enter the stud 49 (Fig. 2) into the cam race 52.

A latch 145 (Fig. 11) pivoted on the frame 146, engages the stud 128 when the shaft 91 is in the "on" position to maintain the shaft in the "on" position. A spring 146 holds the latch in engagement with the stud 128. The shaft 91 must be released from the latch 145 when it is desired to disable the line spacing mechanism and to effect such result the driving pawl 122, when it rocks upwardly upon the failure of the yoke 118, strikes its upper edge against a pin 147 projecting from the latch 145 to overhang the driving pawl. This displaces the latch and frees the shaft 91 to the action of driving pawl 122.

Figure 15:
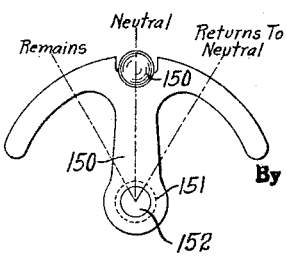
Fig. 15 is a front elevation of the manually adjustable means which controls the operation of the line spacing mechanism.

A manual control is also provided for the statement blank or slip line space feeding mechanism so that the line space mechanism will operate notwithstanding the automatic control. A manually set control lever 150, (Fig. 15), having three positions, a neutral or home position, and two positions of adjustment, controls this mechanism. When this lever 150 is moved to the right (Fig. 15) to the position shown by the dotted line and marked "Returns to neutral", the lever automatically returns to its neutral position at the end of the operation of the machine. However, when this control lever 150 is moved to the left (Fig. 15) to the position shown by the dotted line marked "Remains", the lever stays in this position until it is again returned to its neutral position manually by the operator.

Figure 13:
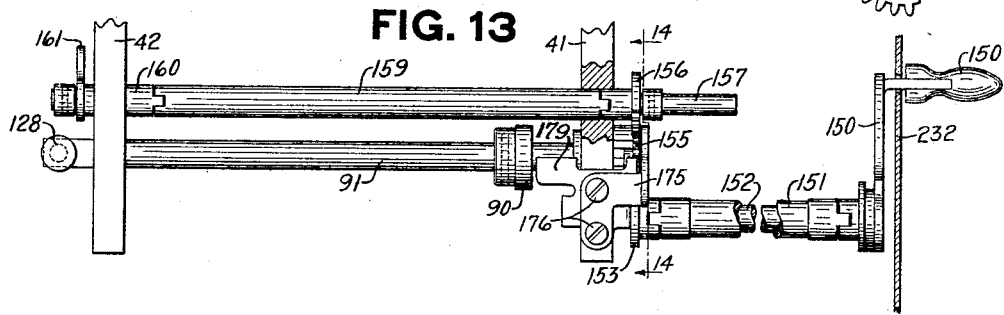
Fig. 13 is a side elevation of the manual control of the line spacing mechanism.
Figure 14:
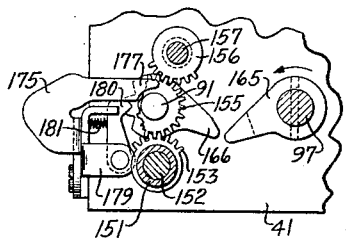
Fig. 14 is a detail view of the mechanism to return the manual control to normal position.

The control lever 150 (Fig. 13), is clutched to a sleeve 151 loosely mounted on a stud 152, mounted in the front frame 41. The sleeve 151 is also clutched to a segment 153 (see also Fig. 14), which meshes with a pinion 155. The pinion 155 is loosely mounted on the before-mentioned shiftable shaft 91 and meshes with a segment 156 on a rocking shaft 157. The segment 156 is clutched to a sleeve 159 extending across the printer unit, (Fig. 13), which sleeve, in turn is clutched to a short sleeve 160, journaled in the back frame 42. A slotted arm 161 (Fig. 12) is secured on this sleeve 160 and a stud 162 secured to the yoke 118, projects into the slot of the arm 161.

When the control lever 150 (Fig. 15) is in the neutral or home position, the slotted arm 161 is in the position shown in Fig. 12. When in this position, the yoke 118 is free to move under control of the rack 116. However, when the control lever 150 is moved either to the right or to the left, (Fig. 15), the slotted arm 161 is also moved in a corresponding direction, to engage one or the other of the inclined walls of its slot with the stud 162, and positively hold the yoke 118 against dropping. This prevents the line space mechanism from being disabled or "thrown off" by the automatic mechanism shown in Fig. 11, for controlling the line space mechanism, notwithstanding depression of the control keys.

As above mentioned, when the lever 150 is moved to the right, (Fig. 15), it is automatically returned to its home position at the end of the following operation of the machine. This return movement is accomplished by means of a cam arm 165 (Fig. 14) secured to the before mentioned cam shaft 97. Secured to the pinion 155 is a finger 166, which is normally out of the path of the cam arm 165. However, when the control lever 150 is moved to the right, (Fig. 15) the finger 166 is rocked into the path of the arm 165, and therefore, near the end of the operation of the machine, the cam arm 165 engages the finger 166 and returns it to its neutral position, thereby returning the control lever 150 to its neutral position.

When, however, the control lever 150 is moved to the left (Fig. 15), the finger 166 is rocked farther away from the arm 165, and therefore, during the operation of the machine when the cam arm 165 is rotated, the movement thereof is idle because the finger 166 is out of the path of the arm 165. Hence the manual control lever 150 remains in its adjusted position.

It will be remembered that the shiftable shaft 91 is shifted axially in its bearings, and to prevent the pinion 155 and finger 166 thereon from accompanying the shaft in its axial travel, a bracket 175 (Fig. 13), is secured to the printer frame 41 by two screws 176, to hold the pinion 155 in position. The bracket 175 has a finger 177 (Fig. 14) always in engagement with the front face of the pinion 155. By referring to Fig. 2, it will be seen that the pinion 155 is spaced from the frame 41 by the finger 166. Thus the finger 177 prevents movement of the pinion 155 when the shaft 91 is shifted in one direction, and the frame 41 prevents movement of the pinion 155 and finger 166 when the shaft 91 is shifted in the other direction.

A second bracket 179 (Figs. 2 and 13) is secured to the frame 41 by means of the two screws 176, and has pivoted thereon a retaining pawl 180 (Fig. 14) to engage notches in the before mentioned finger 166. A spring 181 maintains the pawl 180 in engagement with one of the three notches in this finger and maintains the control lever 150 and its associated mechanism, in either the neutral, or one of its two adjusted positions.

*Tension roller control*

The tension roller release mechanism illustrated herein is an improvement over a tension roller release mechanism disclosed in Letters Patent of the United States, No. 1,626,880, issued to B. M. Shipley on May 3, 1927.

As before mentioned, the tension or drive roller 46 is adapted to be pressed against the driven roller 45 by the two springs 65 (Figs. 2 and 3). In the form illustrated herein, the mechanism is so constructed that when the "balance" key 93 is depressed, the tension roller 46 is automatically withdrawn from the driven roller 45 during the operation of the machine to permit the slip or statement blank to be readily removed from the slip table.

A cam 190 (Figs. 2 and 3) secured to the cam shaft 48 operates to swing the tension roller 46 downwardly away from the driven roller 45. The cam 190 has a cam race 191 to shift a pitman 192 first to the left and then back to its normal righthand position. The pitman 192 is slotted near its lefthand end to embrace a collar on the cam shaft 48 and at its righthand end is slotted to accommodate a stud 193 projecting from the printer front frame 41. A driving pawl 194 pivoted on the righthand end of the pitman 192, carries a stud 195 projecting into a slot 196 of a guide 197 pivoted on a stud 198 carried by the printer front frame 41. A latch 199 pivoted on the rockshaft 64 carries stud 200, adapted to hold the guide 197 in the uppermost of its positions. If the guide 197 is in its uppermost position, as shown in Figs. 3 and 4, and the pitman 192 is operated, the operation is idle, because the driving pawl 194 is moved to the left and then back to the right again without swinging the tension roller 46 away from the driven roller 45, and the paper will be advanced unless the automatic control disables the line spacing mechanism.

When the "balance" key 93 is depressed, (Fig. 16), and the differentially movable arm 102 is adjusted accordingly, a disk 201 (Fig. 3) secured on the differentially adjustable shaft 114 connected with the arm 102, is positioned so that a node 202 thereon engages a stud 203, as shown in Fig. 5. The stud 203 is carried on a latch-operating arm 204 pivoted on the stud 68 carried by the printer frame 41. The latch-operating arm 204 carries stud 206 in the path of a finger 207 on the latch 199. The node 202 of the disk 201 rocks the latch-operating arm 204 upwardly, forcing the stud 206 against the finger 207 on the latch 199 to rock the latch and displace the stud 200 from beneath the guide 197, thereby permitting the guide to drop. The downward movement of the guide 197 is assisted by means of a spring 208 which is stretched between a stud 209 on the driving pawl 194 and a stud 210 on the pitman 192. When the latch 199 is shifted, as just explained, to release guide 197, the driving pawl 194 drops with it until it contacts a stud 211 carried by an arm 212 secured to the before mentioned shaft 64. Upon subsequent movement of the pitman 192 toward the left, (Figs. 3, 4 and 5), the driving pawl 194 passes behind the stud 211, and upon the return movement of the pitman 192 toward the right, the driving pawl 194 on the pitman forces the stud 211 to the right, to rock the arm 212, and the shaft 64 to which it is secured, in counter-clockwise direction. Also secured to the shaft 64 is a pair of arms 220, (see also Fig. 2), each of which arms carries a stud 221. The studs 221 extend beneath the respective levers 62 and 63 supporting the tension roller 46, but the springs 65 operate on the levers 62 and 63 to press the tension roller 46 against the driven roller 45. When the arm 212 is rocked in counter-clockwise direction upon movement of the pitman 192 toward the right to rock shaft 64, the arms 220 together with the studs 221, rock the levers 62 and 63, to swing the tension roller 46 downwardly away from the driven roller 45, and to retain it in such displaced position, to relax the grip of the rollers on the paper.

If, during the next operation of the machine, the disk 201 is rotated under control of the keys 92, 94 or 95, to remove the node 202 from the roller 203, the latch-operating arm 204 drops, thereby permitting the latch 199 to rock in clockwise direction under the influence of a spring 225. The spring 225 is stretched between a stud 226 on the guide 197 and the before mentioned stud 200 on the latch 199. The clockwise movement of the latch 199 is arrested by the end 227 of the guide 197. As the pitman 192 moves toward the left, with the latch in this position, a cam edge 228 (Figs. 2, 3 and 4) on the pitman 192 contacts a roller 229 on the guide 197 to lift the guide 197 and pawl 194 high enough to permit the spring 225 to further rock the latch 199 to position its stud 200 beneath the end of guide 197. Then, upon return movement of the pitman 192 toward the right the drive pawl 194 is held by the slot in the guide 197 and passes above the stud 211. Therefore, the tension roller 46 is not withdrawn from the driven roller 45.

From the above, it can be seen that if the guide 197 is in the position shown in Fig. 3, the tension roller 46 is not withdrawn from the roller 45. However, when the "balance" key 93 is depressed, the disk 201 is positioned to unlatch the guide 197, to permit it to move to the position shown in Fig. 5; the guide 197 then guides the driving pawl 194 into engagement with the stud 211, thereby causing the tension roller 46 to be withdrawn from the driven roller 45.

The tension roller 46 can also be manually withdrawn from the driven roller 45, in the following manner. A manually operable arm 230 secured to shaft 64 (Fig. 3) has a finger piece 231 (see also Fig. 2) projecting through the cabinet 232. Depression of the finger piece 231 rocks the manually movable arm 230, and thereby turns the shaft 64 to cause the arms 220 to swing the frame consisting of the levers 62 and 63, thereby withdrawing the roller 46 from the driven roller 45. An arm 234 secured to the shaft 64 contacts the stud 193 to act as a stop to limit the travel of the manual control lever 230.

A latch 237 (Fig. 3) pivoted on the cabinet 232, is provided to retain the manually movable arm 230, when depressed, in such position. A spring 238 tends to rock the latch 237 into engagement with a stud 239 on the arm 230 when the latter is in its fully depressed position. A finger piece 240 on the latch projects through the cabinet 232 (Fig. 2) so that the latch can be disengaged from the stud 299, to permit the springs 65 to return the tension roller 46 into contact with the driven roller 45, and at the same time, restore the arm 230 and its finger piece 231 to their normal positions.

*Operation*

The machine readily adapts itself to various systems or plans of procedure. Thus, the bookkeeper may prefer to list all the checks first after which he lists the deposit or deposits, and then strikes the balance. Or he may prefer to list the deposit or deposits first in a depositor's account, then list the checks, and finally strike the balance. But in every such operation according to the use selected for illustration in this application, the "balance" key is the last key operated in balancing each depositor's statement. Hence for convenience in the succeeding description, it will be assumed that the normal positions of the parts is that in which they remain at the completion of a "balancing" operation, and that the operator elects to list the checks first, then the deposit or deposits, and then balance the account, it being understood that the machine is adapted for other uses than in banks.

In the use of the machine disclosed herein according to one system of operation, the operator first inserts a statement blank or slip on the slip table, positioned so that the first printing impression will be made on the first line of the slip. The data, including the amount of the first check, is now set up on the keyboard, and the "check 1" key depressed, after which the machine is operated to print the data on the first line in the first or left-hand column marked "Checks" (Fig. 10). The second amount is then set up on the keyboard, and this time the machine is operated with the "check 2" key depressed. With this key depressed, the amount is printed in the second column marked "Checks" on the statement blank (Fig. 10) and the line space mechanism for the blank operates to advance the statement blank one step. In this manner, the various checks are entered on the statement blank by depressing the keys "check 1" and "check 2" alternately, and every time the machine is operated with the "check 2"

key depressed, the statement blank is line spaced.

The line spacing of the statement blank or slip takes place after the printing takes place. If either the "deposit" or the "balance" key is depressed, after the machine has been operated with the "check 2" key depressed, the amount of the balance or deposit will be printed in the line next below that in which the last check was entered. This is due to the fact that at one operation, the amount is printed and then the statement blank or slip is line-spaced to present the next line on the paper to the printing line.

At the end of the "balance" operation, the tension roller 46 is withdrawn from the driven roller 45 to permit the statement blank to be readily removed from the machine and a new statement blank inserted therein. So long as the machine is operated with any of the "check" or the "deposit" keys depressed, the tension roller remains in contact with the driven roller.

While the form of mechanism herein shown and described is admirably adapted to fulfill the objects primarily stated, it is to be understood that it is not intended to confine the invention to the one form or embodiment in various forms all coming within the scope of the claims which follow.

What is claimed is:

1. In a machine of the class described, the combination of a driven roller, a tension roller adapted to contact the driven roller, operating means to withdraw the tension roller from the driven roller, operable during every operation of the machine, automatic means to determine the effectivity of the operating means, and a driving device adapted for adjustment by the automatic means, to cause the operating means to withdraw the tension roller from the driven roller.

2. In a machine of the class described, the combination of a driven roller, a tension roller adapted to contact the driven roller, a frame to support the tension roller, operating means to rock the frame to withdraw the tension roller from the driven roller, means intermediate the frame and the operating means, and an adjustable device between the operating means and the intermediate means automatically set during the operation of the machine to control the withdrawal of the tension roller from the driven roller.

3. In a machine of the class described, the combination of a driven roller, a tension roller adapted to contact the driven roller, a frame to support the tension roller, operating means to rock the frame to withdraw the tension roller from the driven roller, means intermediate the frame and the operating means, an adjustable device between the operating means and the intermediate means to control the withdrawal of the tension roller from the driven roller, a guiding member to guide the device into contact with the intermediate means to withdraw the tension roller from the driven roller, and automatic means to shift the guide member to permit the device to move into position to contact the intermediate means.

4. In a machine of the class described, the combination of a bank of keys, a driven roller, a tension roller, operating means for withdrawing the tension roller from contact with the driven roller, an adjustable device to determine the effectivity of the operating means, and means adjustable during the operation of the machine as controlled by said keys for determining the position of said device.

5. In a machine of the class described, the combination of a bank of keys, a driven roller, a tension roller, operating means to disengage the tension roller from the driven roller, a device to determine the effectivity of the operating means, a guide for said device, and a tripping means controlled by said keys to permit the guide to move into position to guide the device to withdraw the tension roller from the driven roller.

6. In a machine of the class described, the combination of a bank of keys, a driven roller, a tension roller, operating means to withdraw the tension roller from the driven roller, a device for determining the effectivity of the operating means, a guide for said device, a latching means adapted to maintain the guide in effective position, a tripping means for the guide, a cam controlled by the bank of keys to move the latch out of latching position to permit the guide to move into position to guide the device to withdraw the tension roller from the driven roller.

7. In a machine of the class described, the combination of a feeding mechanism, a manually adjustable control lever to control the feeding mechanism said lever having a neutral position and two positions of adjustment, and means to cam said control lever to its neutral position when the machine is operated with the lever in one of its adjusted positions said means being ineffective to cam said lever to its neutral position from the other of its adjusted positions.

8. In a machine of the class described, the combination of a feeding mechanism, a manually adjustable control lever to control the feeding mechanism said lever having a neutral position and two positions of adjustment, a cam member operated during every operation of the machine, and an arm connected with said lever and adapted to be moved into the path of the cam when the lever is adjusted to one of its positions of adjustment whereby the lever is cammed back to its neutral position during the operation of the machine by the cam member, said arm being moved out of the path of the cam member when the lever is adjusted to its other position of adjustment, to permit the lever to remain in the adjusted position after operation of the machine.

9. In a machine of the class described, the combination of a feeding mechanism, a cam, a roller adapted to be projected into the cam to operate the feeding mechanism, a control lever having a neutral position and two positions of adjustment, said lever being adapted to control said roller so that it is entered into the cam when the lever is in any one of its positions of adjustment, and a cam arm for restoring the lever to its neutral position.

10. In a machine of the class described, the combination of a feeding mechanism, a cam, a roller adapted to be projected into the cam to operate the feeding mechanism, a control lever having a neutral position and two positions of adjustment, mechanism controlled by the lever to enter the roller into the cam when the lever is in either one of its adjusted positions, and a cam arm to restore the lever to its neutral position, from one of its adjusted positions, said cam arm being ineffective to restore the lever when the lever is moved to its other position of adjustment.

11. In a machine of the class described, the combination of a roller on a fixed axis, a tension roller adapted to contact said roller, an oscillatory member to withdraw the tension roller from the roller on the fixed axis, an adjustable driving pawl pivoted on the oscillatory member, and automatic means to adjust the pawl to control the effectivity of the oscillatory member.

12. In a machine of the class described, the combination of a roller on a fixed axis; a tension roller adapted to contact said roller; an oscillatory member to withdraw the tension roller from the roller on the fixed axis; an adjustable driving pawl pivoted on the oscillatory member to withdraw the tension roller from contact with the roller on the fixed axis; an adjustable device; and connections between said device and the driving pawl, whereby upon a certain adjustment of the device the connections are operated to render the driving pawl ineffective to withdraw the tension roller.

13. In a machine of the class described, the combination of a driven roller; a tension roller adapted to contact the driven roller; operating means to withdraw the tension roller from the driven roller, said operating means including an adjustable pawl; a resiliently operable guide for the pawl, normally in restrained position; and automatic tripping means for the guide to adjust the pawl into position to render the operating means effective to withdraw the tension roller from the driven roller.

14. In a machine of the class described, the combination of a driven roller; a tension roller adapted to contact the driven roller; operating means to withdraw the tension roller from the driven roller, said operating means including an adjustable pawl, said pawl having effective and ineffective positions; a spring-actuated device to determine the position of the pawl; tripping means to maintain the device in one position; and means to withdraw the tripping means to release the spring actuated device to shift the pawl to its effective position.

In testimony whereof we affix our signatures.

PASCAL SBURLINO.
HARRY F. GAEKE.